United States Patent
Tam et al.

(10) Patent No.: US 7,134,842 B2
(45) Date of Patent: Nov. 14, 2006

(54) SCALLOPED SURFACE TURBINE STAGE

(75) Inventors: Anna Tam, Clifton Park, NY (US); Ching-Pang Lee, Cincinnati, OH (US); Kevin Richard Kirtley, Scotia, NY (US); Ronald Scott Bunker, Niskayuna, NY (US); Scott Henry Lamson, Menands, NY (US); Scott Michael Carson, Mason, OH (US)

(73) Assignee: General Electric Company, Schenectady, NY (US)

( * ) Notice: Subject to any disclaimer, the term of this patent is extended or adjusted under 35 U.S.C. 154(b) by 102 days.

(21) Appl. No.: 11/022,121

(22) Filed: Dec. 24, 2004

(65) Prior Publication Data

US 2006/0140768 A1   Jun. 29, 2006

(51) Int. Cl.
    *F01D 5/22* (2006.01)
(52) U.S. Cl. .................................. 416/193 A
(58) Field of Classification Search ............. 416/193 A
    See application file for complete search history.

(56) References Cited

U.S. PATENT DOCUMENTS

| | | | |
|---|---|---|---|
| 4,194,869 A | 3/1980 | Corcokios | |
| 4,778,338 A | 10/1988 | Bessay | |
| 4,832,567 A | 5/1989 | Bessay | |
| 5,397,215 A | 3/1995 | Spear et al. | |
| 6,017,186 A | 1/2000 | Hoeger et al. | |
| 6,283,713 B1 | 9/2001 | Harvey et al. | |
| 6,338,609 B1 | 1/2002 | Decker et al. | |
| 6,341,939 B1 | 1/2002 | Lee | |
| 6,354,797 B1 | 3/2002 | Heyward et al. | |
| 6,419,446 B1 | 7/2002 | Kvasnak et al. | |
| 6,478,545 B1 * | 11/2002 | Crall et al. ............. 416/213 R |
| 6,511,294 B1 | 1/2003 | Mielke et al. | |
| 6,561,761 B1 | 5/2003 | Decker et al. | |
| 6,669,445 B1 | 12/2003 | Staubach et al. | |
| 6,719,529 B1 | 4/2004 | Tiemann | |
| 6,830,432 B1 | 12/2004 | Scott et al. | |
| 6,837,679 B1 * | 1/2005 | Kawarada et al. .......... 415/191 |
| 2004/0081548 A1 | 4/2004 | Zees et al. | |

FOREIGN PATENT DOCUMENTS

| | | |
|---|---|---|
| CH | 229266 | 1/1944 |
| FR | 1602965 | 4/1971 |
| JP | 58-32903 | 2/1983 |

OTHER PUBLICATIONS

Harvey et al, "Non-Asxisymmetric Turbine End Wall Design: Part 1 Three Dimensional Linear Design System," ASME 99-GT-337, Jun. 1999, pp. 1-9.
U.S. Appl. No. , filed Dec. 13, 2004, entitled "Fillet Energized Turbine Stage," by Ching-Pang Lee.
U.S. Appl. No. 11/010,688, filed Dec. 13, 2004, entitled "Fillet Energized Turbine Stage," by Ching-Pang Lee.
Patent Abstract of Japan, vol. 007, No. 112 (M-215), May 17, 1983, European Patent Office, publication No. 58032903, pub. Date Feb. 26, 1983, single page.

* cited by examiner

*Primary Examiner*—Edward K. Look
*Assistant Examiner*—Nathan Wiehe
(74) *Attorney, Agent, or Firm*—William S. Andes; Francis L. Conte (57) ABSTRACT

A turbine stage includes a row of airfoils joined to corresponding platforms to define flow passages therebetween. Each airfoil includes opposite pressure and suction sides and extends in chord between opposite leading and trailing edges. Each platform has a scalloped flow surface including a bulge adjoining the pressure side adjacent the leading edge, and a bowl adjoining the suction side aft of the leading edge.

28 Claims, 5 Drawing Sheets

SCALLOPED SURFACE TURBINE STAGE

BACKGROUND OF THE INVENTION

The present invention relates generally to gas turbine engines, and, more specifically, to turbines therein.

In a gas turbine engine air is pressurized in a compressor and mixed with fuel in a combustor for generating hot combustion gases. Turbine stages extract energy from the combustion gases to power the compressor, while also powering an upstream fan in a turbofan aircraft engine application, or powering an external drive shaft for marine and industrial applications.

A high pressure turbine (HPT) immediately follows the combustor and includes a stationary turbine nozzle which discharges combustion gases into a row of rotating first stage turbine rotor blades extending radially outwardly from a supporting rotor disk. The HPT may include one or more stages of rotor blades and corresponding turbine nozzles.

Following the HPT is a low pressure turbine (LPT) which typically includes multiple stages of rotor blades and corresponding turbine nozzles.

Each turbine nozzle includes a row of stator vanes having radially outer and inner endwalls in the form of arcuate bands which support the vanes. Correspondingly, the turbine rotor blades include airfoils integrally joined to radially inner endwalls or platforms supported in turn by corresponding dovetails which mount the individual blades in dovetail slots formed in the perimeter of the supporting rotor disk. An annular shroud surrounds the radially outer tips of the rotor airfoils in each turbine stage.

The stator vanes and rotor blades have corresponding airfoils including generally concave pressure sides and generally convex suction sides extending axially in chord between opposite leading and trailing edges. Adjacent vanes and adjacent blades form corresponding flow passages therebetween bound by the radially inner and outer endwalls.

During operation, the combustion gases are discharged from the combustor and flow axially downstream through the respective flow passages defined between the stator vanes and rotor blades. The aerodynamic contours of the vanes and blades, and corresponding flow passages therebetween, are precisely configured for maximizing energy extraction from the combustion gases which in turn rotate the rotor from which the blades extend.

The complex three-dimensional (3D) configuration of the vane and blade airfoils is tailored for maximizing efficiency of operation, and varies radially in span along the airfoils as well as axially along the chords of the airfoils between the leading and trailing edges. Accordingly, the velocity and pressure distributions of the combustion gases over the airfoil surfaces as well as within the corresponding flow passages also vary.

Undesirable pressure losses in the combustion gas flowpaths therefore correspond with undesirable reduction in overall turbine efficiency. For example, the combustion gases enter the corresponding rows of vanes and blades in the flow passages therebetween and are necessarily split at the respective leading edges of the airfoils.

The locus of stagnation points of the incident combustion gases extends along the leading edge of each airfoil, and corresponding boundary layers are formed along the pressure and suction sides of each airfoil, as well as along each radially outer and inner endwall which collectively bound the four sides of each flow passage. In the boundary layers, the local velocity of the combustion gases varies from zero along the endwalls and airfoil surfaces to the unrestrained velocity in the combustion gases where the boundary layers terminate.

One common source of turbine pressure losses is the formation of horseshoe vortices generated as the combustion gases are split in their travel around the airfoil leading edges. A total pressure gradient is effected in the boundary layer flow at the junction of the leading edge and endwalls of the airfoil. This pressure gradient at the airfoil leading edges forms a pair of counterrotating horseshoe vortices which travel downstream on the opposite sides of each airfoil near the endwall.

The two vortices travel aft along the opposite pressure and suction sides of each airfoil and behave differently due to the different pressure and velocity distributions therealong. For example, computational analysis indicates that the suction side vortex migrates away from the endwall toward the airfoil trailing edge and then interacts following the airfoil trailing edge with the pressure side vortex flowing aft thereto.

The interaction of the pressure and suction side vortices occurs near the midspan region of the airfoils and creates total pressure loss and a corresponding reduction in turbine efficiency. These vortices also create turbulence and increase undesirable heating of the endwalls.

Since the horseshoe vortices are formed at the junctions of turbine rotor blades and their integral root platforms, as well at the junctions of nozzle stator vanes and their outer and inner bands, corresponding losses in turbine efficiency are created, as well as additional heating of the corresponding endwall components.

Accordingly, it is desired to provide an improved turbine stage for reducing horseshoe vortex affects.

BRIEF DESCRIPTION OF THE INVENTION

A turbine stage includes a row of airfoils joined to corresponding platforms to define flow passages therebetween. Each airfoil includes opposite pressure and suction sides and extends in chord between opposite leading and trailing edges. Each platform has a scalloped flow surface including a bulge adjoining the pressure side adjacent the leading edge, and a bowl adjoining the suction side aft of the leading edge.

BRIEF DESCRIPTION OF THE DRAWINGS

The invention, in accordance with preferred and exemplary embodiments, together with further objects and advantages thereof, is more particularly described in the following detailed description taken in conjunction with the accompanying drawings in which.

DETAILED DESCRIPTION OF THE INVENTION

Figure 1:
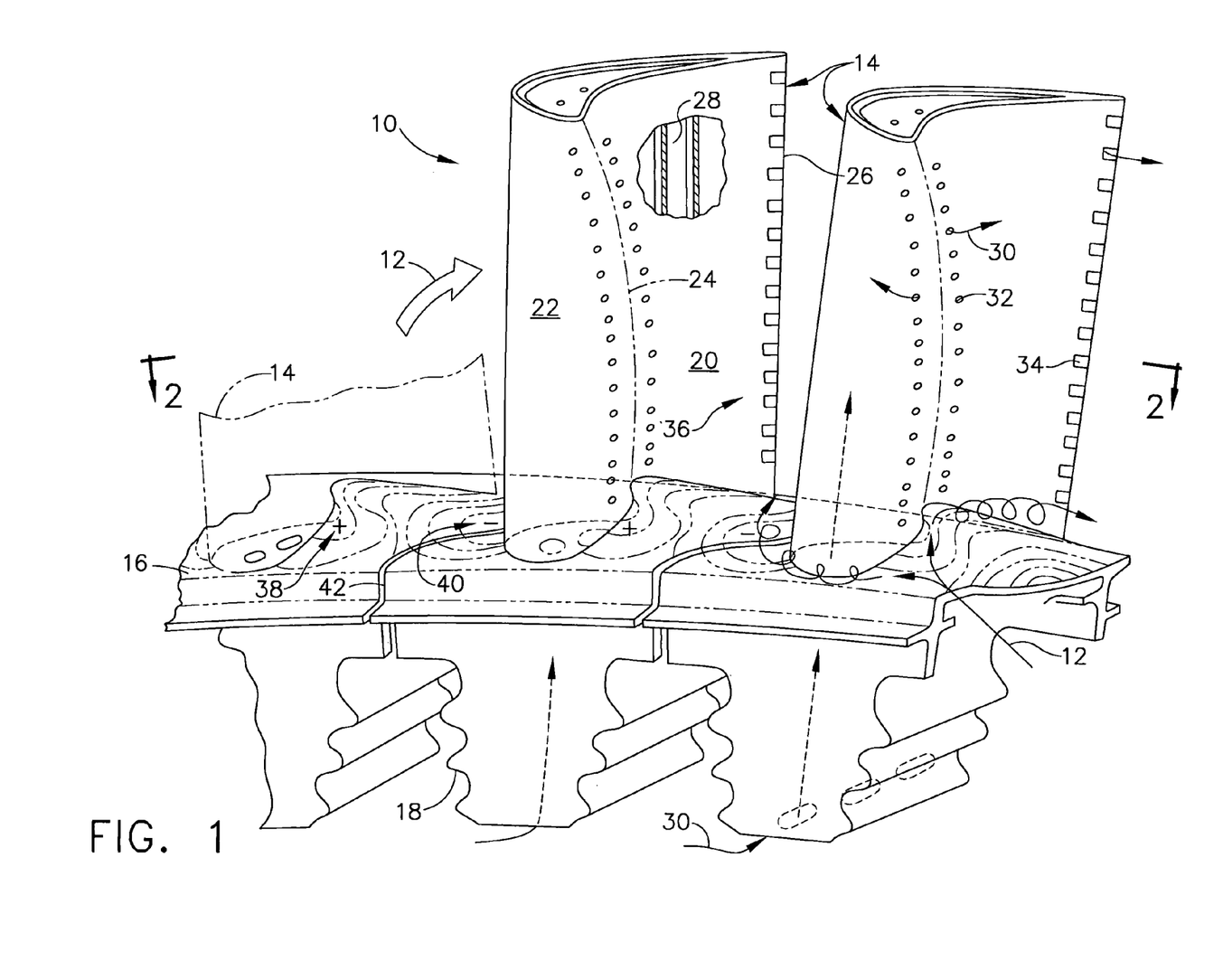
FIG. 1 is a forward-facing-aft elevational view of exemplary turbine blades in a turbine stage row.

Illustrated in FIG. 1 are two exemplary first stage turbine rotor blades 10 which circumferentially adjoin each other in a full row thereof in a corresponding turbine stage of a gas turbine engine. As indicated above, combustion gases 12 are formed in a conventional combustor (not shown) and discharged in the axial downstream direction through the row of turbine blades 10 which extract energy therefrom for powering a supporting rotor disk (not shown) on which the blades are mounted.

The turbine stage includes a complete row of the blades, with each blade having a corresponding airfoil 14 integrally joined at a root end to a corresponding radially inner endwall or platform 16. Each platform is in turn integrally joined to a corresponding axial-entry dovetail 18 conventionally configured for supporting the corresponding turbine blade in the perimeter of the rotor disk.

Each airfoil includes a generally concave pressure side 20 and a circumferentially or laterally opposite, generally convex suction side 22 extending axially in chord between opposite leading and trailing edges 24,26. The two edges extend radially in span from root to tip of the airfoil.

Figure 2:
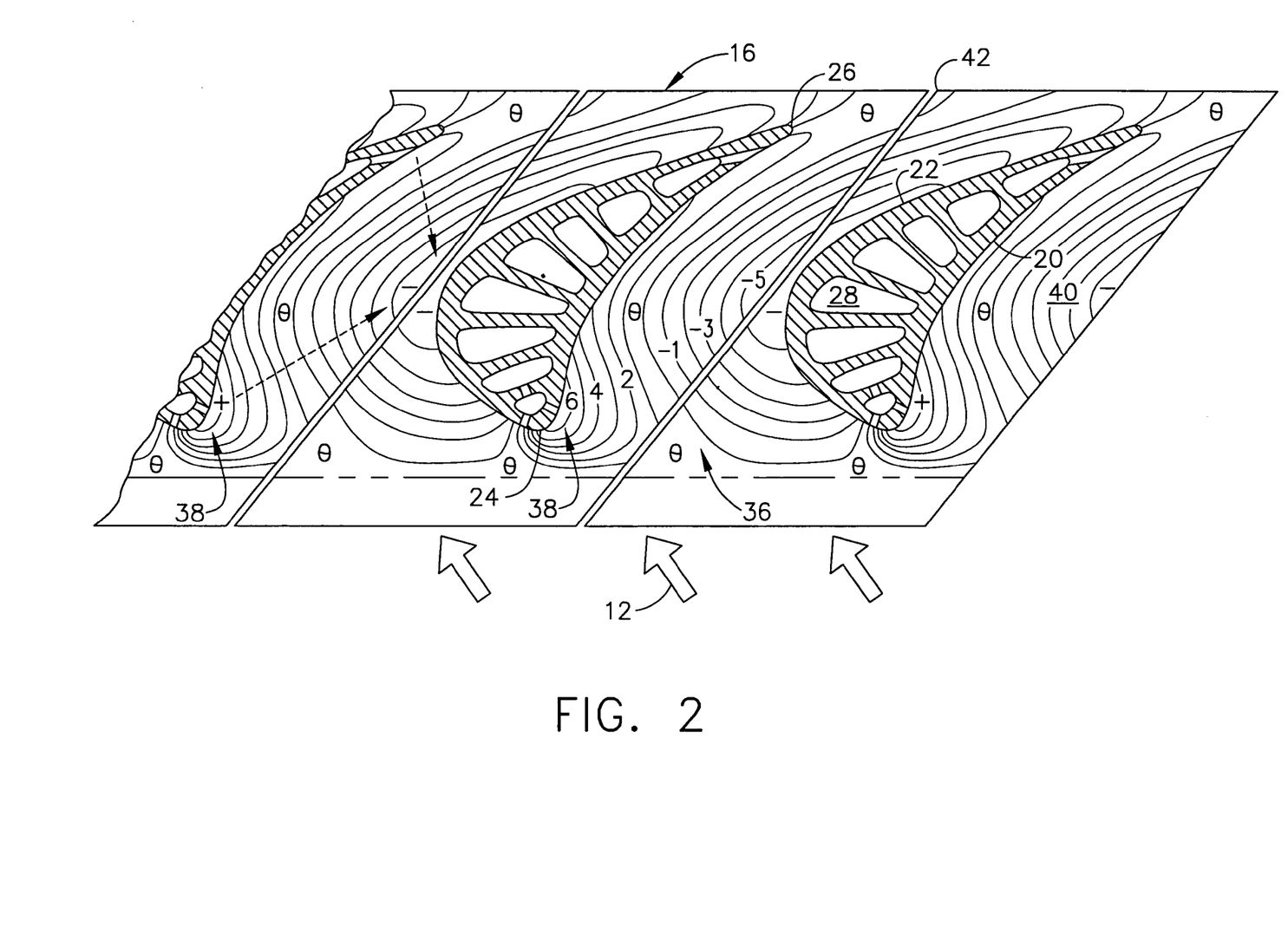
FIG. 2 is a planiform sectional view through the blades illustrated in FIG. 1 and taken along line 2—2.

As shown in FIGS. 1 and 2, each airfoil is hollow and includes an internal cooling circuit 28 bound by the opposite pressure and suction sides. The cooling circuit may have any conventional configuration and includes inlet channels extending through the platform and dovetail for receiving cooling air 30 bled from the compressor of the engine (not shown).

The cooling air is typically discharged from each airfoil through several rows of film cooling holes 32 located where desired on the pressure and suction sides of the airfoil, and typically concentrated near the leading edge thereof. Each airfoil typically also includes a row of trailing edge cooling holes 34 which emerge through the pressure side of the airfoil just before the thin trailing edge thereof.

The exemplary turbine blades illustrated in FIGS. 1 and 2 may have any conventional configuration of the airfoil, platform, and dovetail for extracting energy from the combustion gases 12 during operation. As indicated above, the platform 16 is integrally joined to the root end of the airfoil and defines the radially inner flow boundary for the combustion gases 12.

The blades are mounted in a row around the perimeter of the rotor disk, with the adjacent airfoils 14 being spaced circumferentially or laterally apart to define therebetween flow passages 36 for channeling the combustion gases 12 axially in the downstream direction during operation.

Each inter-airfoil flow passage 36 in the turbine stage illustrated in FIGS. 1 and 2 is therefore defined and bounded by the pressure side 20 of one airfoil, the suction side 22 of the next adjacent airfoil, the corresponding pressure and suction side portions of the adjacent platforms 16, and the radially outer turbine shroud (not shown) which surrounds the radially outer tip ends of the airfoils in the complete row of turbine blades.

As indicated above in the Background section, the combustion gases 12 flow through the corresponding flow passages 36 during operation and are necessarily split by the individual airfoils 14. The high velocity combustion gases are circumferentially split at the corresponding airfoil leading edges 24 with a stagnation pressure thereat, and with the formation of corresponding boundary layers along the opposite pressure and suction sides of the airfoil.

Furthermore, the combustion gases also form a boundary layer along the individual blade platforms 16 as the gases are split around the airfoil leading edge at its juncture with the platform.

Accordingly, the split combustion gas flow along the blade platforms results in a pair of counterrotating horseshoe vortices which flow axially downstream through the flow passages along the opposite pressure and suction sides of each airfoil. These horseshoe vortices create turbulence in the boundary layers, and migrate radially outwardly toward the mid-span regions of the airfoils and create losses of total pressure and reduce turbine efficiency.

The exemplary turbine rotor stage illustrated in FIG. 1 may have any conventional configuration such as that specifically designed as a first stage HPT rotor for extracting energy from the combustion gases to power the compressor in a typical manner. As indicated above in the Background section, the incident combustion gases 12 are split along the airfoil leading edges 24 to flow axially through the corresponding flow passages 36 in the downstream direction.

The concave profile of the pressure sides 20 and the convex profile of the suction sides 22 are specifically configured for effecting different velocity and pressure distributions for maximizing extraction of energy from the combustion gases. And, the platforms 16 define radially inner endwalls which bound the combustion gases, with the gases also being bound radially outwardly by a surrounding turbine shroud (not shown).

In this configuration, the incident combustion gases at the junction of the platforms and leading edges is subject to the horseshoe vortices which progress through the flow passages along the opposite pressure and suction sides of the airfoils. As indicated above, these vortices create turbulence, decrease the aerodynamic efficiency of the turbine stage, and increase the heat transfer heating of the platforms.

Accordingly, the platforms 16 illustrated initially in FIG. 1 are specifically configured with scalloped flow surfaces that bound the combustion gases for reducing the strength of the horseshoe vortices. An exemplary configuration of the scalloped platforms is shown generally in FIG. 1 with isoclines of common elevation from a nominally axisymmetric platform. And, FIG. 2 illustrates in more detail the isoclines in planiform view.

Modern computational fluid dynamics have been used to study and define the specific 3D contours of the platforms for weakening the horseshoe vortices and correspondingly improving turbine efficiency. The scalloped platforms illustrated in FIGS. 1 and 2 include a local bump or bulge 38 rising upwardly (+) into the flow passage 36 relative to the nominal axisymmetric reference surface of a conventional platform that defines the reference zero (θ) surface. Cooperating with the local bulge 38 is an integral gouge or bowl 40 that has a lower elevation (−) relative to the nominal axisymmetric platform surface to form a depression therein.

It is noted that the specific sizes and spacing of the airfoils 14 are selected for a particular engine design and mass flowrate therethrough. The arcuate sidewalls of the airfoils typically define a flow passage 36 circumferentially therebetween that converges in the axial downstream direction from the leading edges to the trailing edges.

The trailing edge of one airfoil typically forms a throat of minimum flow area along its perpendicular intersection near the midchord of the suction side of an adjacent airfoil. The flow area of the flow passage 36, including the minimum flow area of the throat thereof, are preselected for a given engine application and therefore are controlled by both the radially inner endwall defined by platform 16, as well as the radially outer endwalls defined by the turbine shroud (not illustrated).

The reference platform surface may therefore be conveniently defined as the conventional axisymmetrical surface defined by circular arcs around the circumference of the turbine stage, and may be used as the zero reference elevation illustrated in FIG. 2. The bulge 38 therefore rises outwardly in elevation (+) from the zero reference plane or surface, whereas the bowl 40 extends in depth (−) below the reference plane or surface. In this way, the bulge and bowl may complement and offset each other for maintaining the desired or given flow area for each flow passage.

The bulges and bowls illustrated in FIGS. 1 and 2 are preferentially located specifically for reducing the strength of the horseshoe vortices and improving turbine efficiency. The bulge 38 directly adjoins the airfoil pressure side 20 adjacent to the leading edge 24. And, the bowl 40 directly adjoins the airfoil suction side 22 aft of the leading edge 24.

By using the leading edge bulge, the incoming horseshoe vortices can be offset by local streamline curvature of the combustion gases around the bulge. Correspondingly, the radially outward migration of the horseshoe vortices can be interrupted early in the flow passage by the bowl.

The bulge and bowl are effective for reducing flow acceleration of the combustion gases, increasing local static pressure, altering gradients in gas pressure, reducing vortex stretching, and reducing reorientation of the horseshoe vortices as they travel downstream through the flow passages. These combined effects limit the ability of the horseshoe vortices to migrate radially outwardly along the airfoil suction side, and reduce the vortex strength for in turn increasing overall efficiency of the turbine stage.

Figure 3:
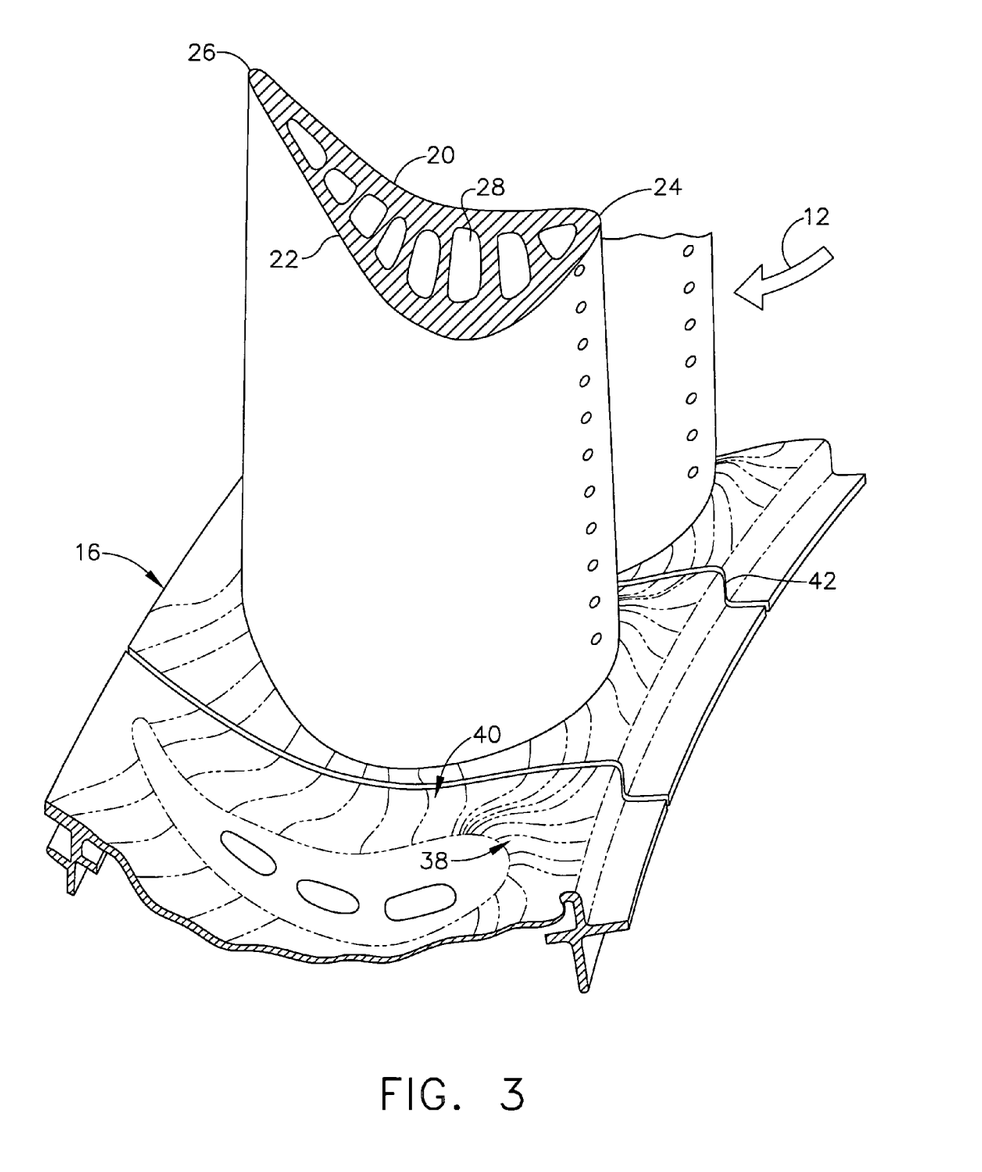
FIG. 3 is a isometric view of the suction side of the blades illustrated in FIG. 1 including scalloped platforms thereof.

As indicated above, FIG. 2 is a planiform view of the platforms with isoclines of equal elevation relative to the reference zero surface. FIG. 3 illustrates the platforms in isometric view with superimposed surface gradient lines to emphasize the 3D varying contour of the platforms between the forward and aft ends of each platform and circumferentially or laterally between adjacent airfoils.

Since the platforms extend on both sides of each airfoil, typically with small extensions forward of the leading edge and aft of the trailing edge, the elevated bulge and depressed bowl will smoothly transition with each other in a preferred manner for reducing the strength of the horseshoe vortices. Preferably, the bulge 38 decreases in height or elevation as it wraps around the leading edge 24 to join the bowl 40 along the suction side 22. The bowl 40 extends along the suction side 22 between the leading and trailing edges, commencing, for example, closely adjacent to the leading edge and terminating at the trailing edge.

Figure 4:
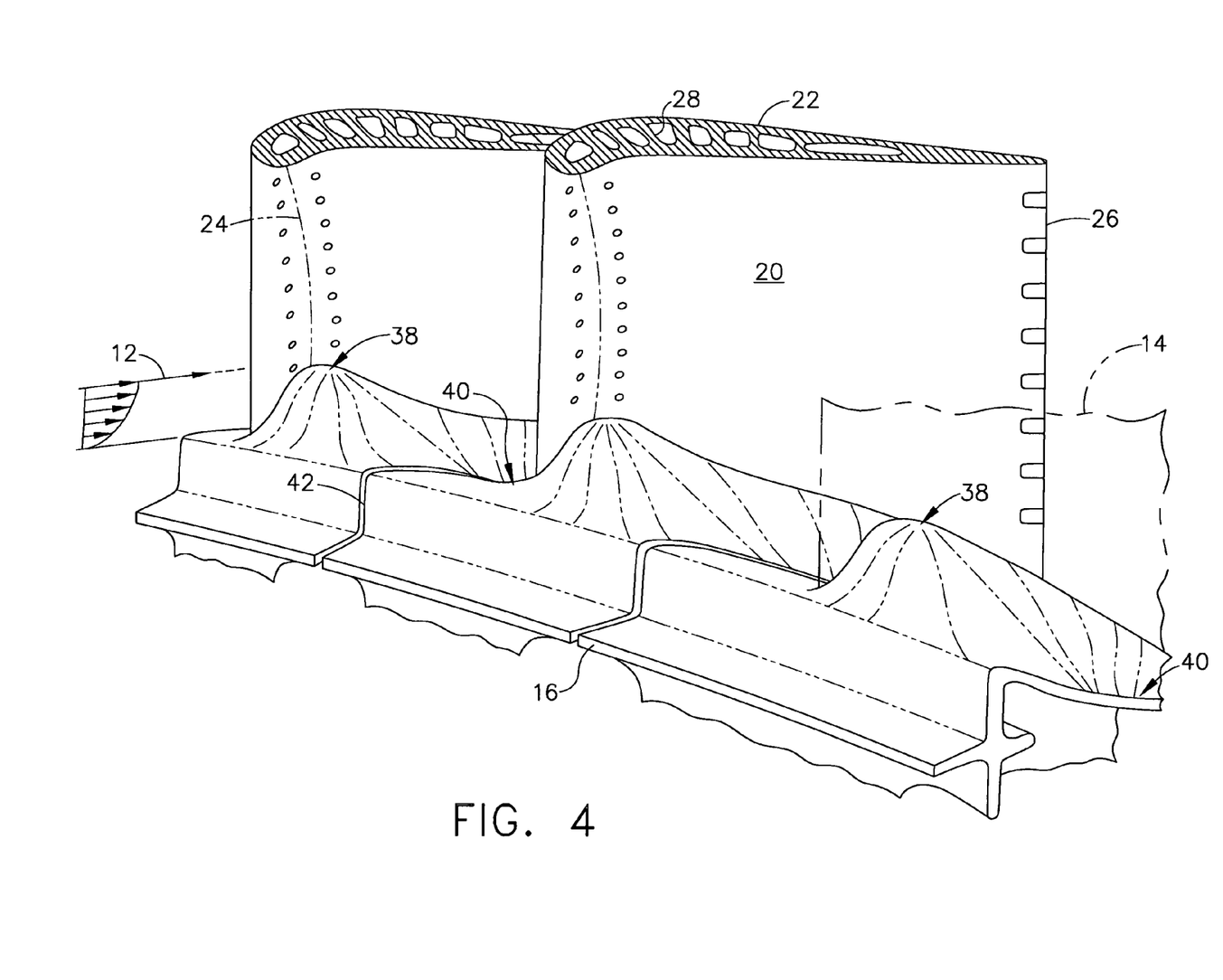
FIG. 4 is an isometric view of the pressure side of the blades illustrated in FIG. 1 including the scalloped platforms thereof.

FIGS. 2 and 4 best illustrate that the bulge 38 is centered with maximum height at the pressure side 20 adjacent to the leading edge 24, and decreases in height forward around the leading edge, and aft towards the trailing edge, as well as laterally or circumferentially from the pressure side of one airfoil toward the suction side of the next adjacent airfoil.

Figure 5:
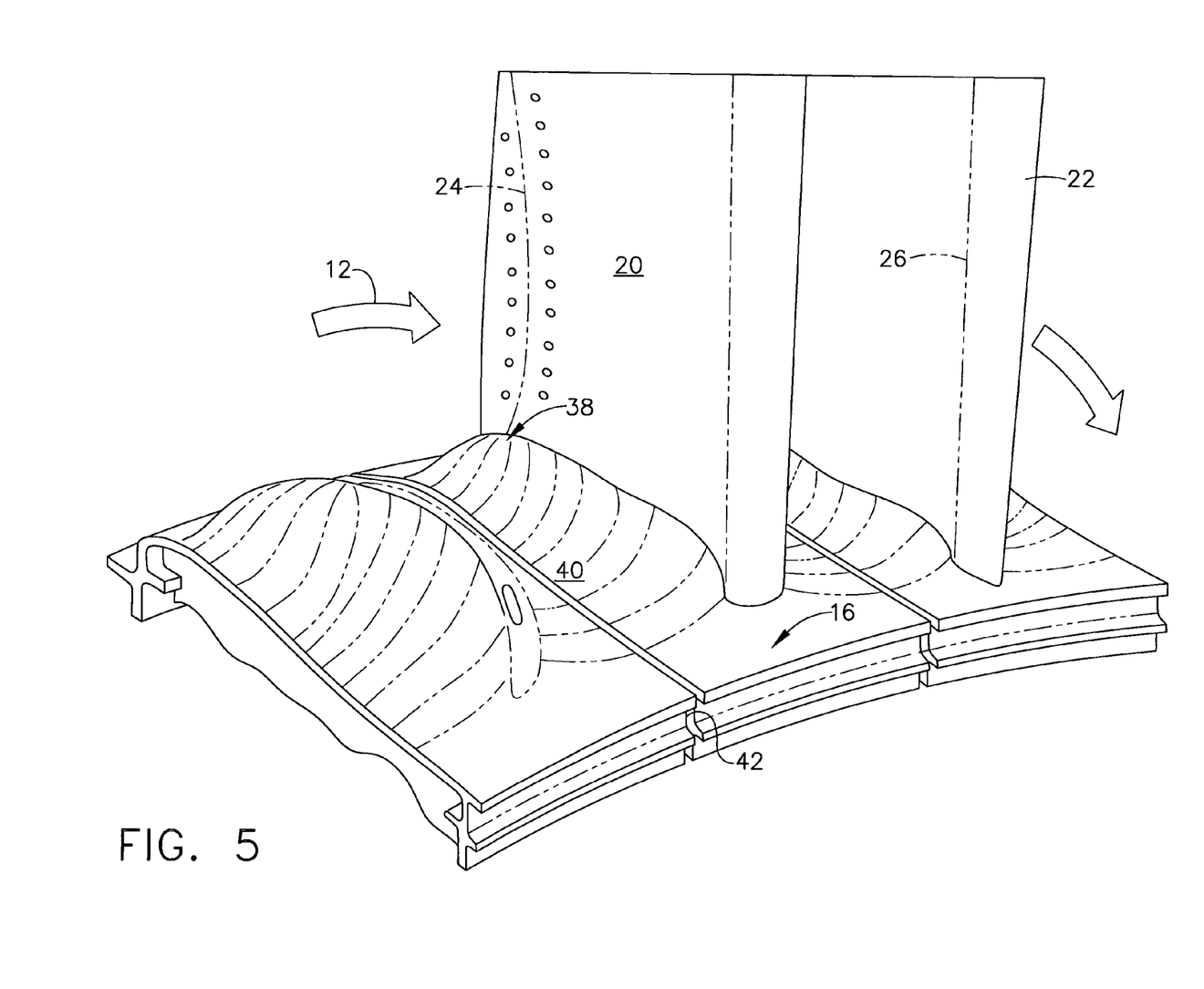
FIG. 5 is a isometric view aft-facing-forward of the blades illustrated in FIG. 1 including the scalloped platforms thereof.

FIGS. 2 and 5 best illustrate that the bowl 40 is centered with maximum depth at the suction side 22 near the maximum lateral thickness of each airfoil in its hump region, and decreases in depth forward towards the leading edge, aft towards the trailing edge, as well as laterally or circumferentially from the suction side of one airfoil towards the pressure side of the next adjacent airfoil where it blends with the elevated bulge.

FIG. 4 illustrates schematically the incident combustion gases 12 which have a corresponding boundary layer in which the velocity of the combustion gases is zero directly at the flow surface of the platform and increases rapidly to the freestream velocity. The thickness of the boundary layer ranges from about two percent to about 15 percent of the radial height or span of the airfoil 14. The magnitude of the platform scalloping can be relatively small to specifically reduce the strength of the horseshoe vortices to increase turbine efficiency.

For example, the bulge 38 as shown in FIGS. 2 and 4 has a maximum height which is generally equal to the thickness of the incoming boundary layer of combustion gases 12 as they are first channeled over the platforms.

Correspondingly, the bowl 40 has a maximum depth less than about the maximum height of the bulge 38. In FIG. 2, the isoclines have been labeled with arbitrary numbers from the reference zero surface, with the bulge 38 increasing in height to an exemplary magnitude of about +6, with the bowl 40 increasing in depth to a maximum depth of about −5.

These exemplary numbers are merely representative of the changing contour of the scalloped platform. The actual magnitudes of the bulge and bowl will be determined for each particular design, with the maximum height of the bulge ranging from about 40 mils (1 mm) to about 450 mils (11.4 mm) for turbine airfoils ranging in height from 5 cm to about 7.5 cm.

FIGS. 2 and 4 also illustrate that the bulge 38 is generally semi-spherical against the pressure side 20 of the airfoil, and generally convex both forwardly toward the leading edge and in the aft direction towards the trailing edge. In the axial plane extending circumferentially between the leading edges of the airfoil row, the bulges 38 are conical in section between the convex forward and aft portions thereof in the exemplary embodiment illustrated in FIG. 4 for which computational flow analysis predicts a significant reduction in vortex strength and migration.

The exemplary bowl 40 illustrated in FIGS. 2 and 5 is generally concave laterally from its origin of maximum depth which is positioned directly on the suction side of each airfoil. The bowl 40, like the bulge, is generally semi-spherical, but concave centering on the airfoil suction side.

The scalloped platform 16, including its bulge and bowl, should preferably join the root end of the airfoil 14 at a suitably small fillet of conventional size up to about 50 mils (1.3 mm) for example.

FIGS. 2 and 4 illustrate the abrupt transition between the elevated bulge 38 on the airfoil pressure side, and the bowl 40 on the airfoil suction side around the leading edge. More specifically, the bulge 38 decreases in height rapidly around the short breadth of the leading edge 24 and gradually, in comparison, along the longer extent of the pressure side to the trailing edge 26. The gradual transition of the bulge to the trailing edge forms a ridge extension of the bulge that decreases in elevation.

Correspondingly, the depressed bowl 40 blends with the elevated bulge 38 rapidly near the leading edge 24 in the short transition region therebetween, and gradually, in comparison along the longer extent of the suction side aft to the trailing edge 26 as best illustrated in FIGS. 2 and 3.

FIGS. 2 and 5 illustrate that the bulge 38 decreases continuously in height along the pressure side 20 from its peak height near the leading edge to the trailing edge 26. The bowl 40 decreases in depth along the suction side 22 from its peak depth near the airfoil hump to the trailing edge 26. And, both the bulge 38 and bowl 40 blend together around the trailing edge 26 and terminate laterally or circumferentially in the corresponding flow passages between the trailing edges at the zero reference elevation.

FIGS. 2 and 4 illustrate that the bulges 38 and bowls 40 begin or commence preferably forward of the leading edges 24 and form or define laterally therebetween an axially arcuate flute or channel along the zero elevation contour therebetween. The fluted channel extends axially along the individual platform 16 between adjacent airfoils 16 commencing forward of the leading edges and terminating at the trailing edges, or aft thereof as desired within the available surface space of the platforms.

The zero elevation contour may be a single line, or a land of suitable width between the bulge and bowl. In the land embodiment, the convex bulge preferably blends with one side of the land through an inflection region having a concave transition with the land. And, the concave bowl preferably blends with the other side of the land through another inflection region having a convex transition with the land.

Since the exemplary turbine stage illustrated in the Figures is configured as a turbine rotor stage, the individual platforms are integrally joined to the root of each airfoil, with a corresponding dovetail therebelow, with the platforms collectively defining the radially inner boundary or endwalls for the combustion gas flow. Each platform 16 therefore adjoins an adjacent platform at an axial splitline 42, with the splitlines 42 bifurcating or splitting the inter-airfoil bowls 40 axially between the leading and trailing edges 24,26 in complementary first and second bowl portions.

This is best illustrated in FIG. 2 in which the platform 16 has portions extending from the opposite pressure and suction sides of the airfoil. The bulge 38 is disposed primarily on the pressure side of the platform. The suction side portion of the platform includes a first bowl portion extending over most of the platform surface.

However, the first bowl portion is interrupted by the axial splitline 42 from the complementary second bowl portion integrally formed with the bulge 38 on the pressure side 20 of the next adjacent platform. The first bowl portion on one platform is complementary with the second bowl portion on the next adjacent platform and collectively define a single complete bowl 40 extending from the suction side of one airfoil to the bulge and its ridge along the pressure side of the next adjacent airfoil.

The axial splitlines 42 interrupt the circumferential continuity of the entire turbine row stage, and permit the individual fabrication of each turbine blade in a conventional manner, such as by casting. The overall configuration of the turbine blade including its airfoil, platform, and dovetail may be cast in a conventional manner, and the scalloped platform thereof may also be integrally cast therein where feasible.

Alternatively, the platforms may be cast with nominal axisymmetric platforms with locally elevated material for the bulge, which may then be machined using conventional electrical discharge machining (EDM) or electrochemical machining (ECM) for forming the 3D contour of the scalloped platform, including the final contours of the bulge and bowl.

Since the gradient lines of the bowl portions on the suction side of the airfoil as illustrated in FIG. 2 run generally circumferentially, the 3D bowl contours may be altered to 2D contours varying linearly in the circumferential direction for more readily permitting casting thereof using conventional casting die halves, if desired.

A significant feature of the scalloped platforms illustrated in FIGS. 2 and 4 is the locally elevated bulge 38 provided directly adjacent to the leading edge for weakening the horseshoe vortices at their inception. Preferably each bulge 38 bridges or wraps around the corresponding airfoil leading edge 24 and extends in most part aft from the leading edge along the pressure side to the trailing edge, while extending in substantially minor part around the leading edge to the suction side where it rapidly blends with the corresponding bowl 40 that extends over the large majority of the suction side.

Preferably, the bulge 38 is centered on the natural stagnation point of the incident combustion gases 12 at the leading edge 24. The contour of each airfoil, and twist or angular position thereof, are selected for each design application so that the leading edge of the airfoil first receives the combustion gases typically at an oblique angle from the axial centerline axis, with the combustion gases turning as they flow through the curved flow passages between the airfoils. The natural stagnation point of the incoming combustion gases may be aligned with the leading edge itself or aligned closely adjacent thereto on either the pressure or suction sides of the airfoil.

Accordingly, for each particular design application, the bulge 38 may be centered at the natural stagnation point in the leading edge region of the airfoil. The so positioned bulge 38 and complementary bowl 40 are specifically introduced in the radially inner platforms of the turbine rotor blades to cooperate with each other with synergy for reducing the strength of the horseshoe vortices that stretch and wrap around the leading edge and flow downstream through the flow passages.

The scalloped platform reduces the local flow acceleration and changes the pressure gradient that drive the horseshoe vortices towards the airfoil suction side. The combination of reduced vortex strength and altered pressure gradients reduce migration of the vortices towards the airfoil suction side, and reduces the tendency for the vortices to migrate along the airfoil span for correspondingly reducing losses in turbine efficiency.

The scalloped platforms have been disclosed above for a turbine rotor stage, but could also be applied to a turbine nozzle stage. In a turbine nozzle, turbine vanes are integrally mounted in radially outer and inner endwalls or bands which are typically axisymmetrical circular profiles around the centerline axis. Both the inner and outer bands may be scalloped in a manner similar to that disclosed above for reducing the adverse affects of the corresponding horseshoe vortices generated at the opposite ends of the turbine nozzle vanes.

The scalloped platform may therefore be used for enhancing aerodynamic efficiency in any type of turbine engine, and for any type of turbine airfoil. Further examples include turbine rotor blisks in which the airfoils are integrally formed with the perimeter of the rotor disk. Low pressure turbine blades may include integral outer shrouds in which the scalloped platform may also be introduced. And, steam turbine blades and vanes may also include the scalloped platforms at the corresponding root ends thereof.

Modern computer fluid dynamics analysis now permits the evaluation of various permutations of the scalloped platforms for reducing horseshoe vortices to increase turbine efficiency. The specific contours of the bulges and bowls will vary as a function of the specific design, but the form of the elevated bulge on the airfoil pressure side at the leading edge and the depressed bowl along the suction side blending with the bulge will remain similar for specifically reducing the adverse affects of the horseshoe vortices generated as the combustion gases split over the airfoil leading edges.

While there have been described herein what are considered to be preferred and exemplary embodiments of the present invention, other modifications of the invention shall be apparent to those skilled in the art from the teachings herein, and it is, therefore, desired to be secured in the appended claims all such modifications as fall within the true spirit and scope of the invention.

Accordingly, what is desired to be secured by Letters Patent of the United States is the invention as defined and differentiated in the following claims in which we claim:

The invention claimed is:

1. A turbine stage comprising:
    a row of airfoils integrally joined to corresponding platforms and spaced laterally apart to define respective flow passages therebetween for channeling gases;
    each of said airfoils including a concave pressure side and a laterally opposite convex suction side extending in chord between opposite leading and trailing edges;
    each of said platforms having a scalloped flow surface including a bulge adjoining said pressure side adjacent said leading edge, and a bowl adjoining said suction side aft of said leading edge; and
    said bulge and bowl commence forward of said leading edges and form laterally therebetween an arcuate channel extending axially along said platform between adjacent airfoils.

2. A turbine stage according to claim 1 wherein:
    said bulge decreases in height around said leading edge to join said bowl along said suction side; and
    said bowl extends along said suction side to said trailing edge.

3. A turbine stage according to claim 2 wherein said bulge and bowl terminate laterally in said flow passage between said trailing edges.

4. A turbine stage according to claim 3 wherein:
    said bulge is centered at said pressure side adjacent said leading edge, and decreases in height forward, aft, and laterally therefrom; and
    said bowl is centered at said suction side near the maximum thickness of said airfoils, and decreases in depth forward, aft, and laterally therefrom.

5. A turbine stage according to claim 4 wherein:
    said bulge decreases in height rapidly around said leading edge and gradually to said trailing edge; and
    said bowl blends with said bulge rapidly near said leading edge and gradually to said trailing edge.

6. A turbine stage according to claim 5 wherein said bulge decreases in height along said pressure side to said trailing edge, and said bowl decreases in depth along said suction side to said trailing edge.

7. A turbine stage according to claim 5 wherein said bulge bridges said leading edge.

8. A turbine stage according to claim 5 wherein said bulge is convex forward and aft, and said bowl is concave laterally.

9. A turbine stage according to claim 5 wherein:
    said bulge has a maximum height generally equal to the thickness of the boundary layer of said gases channeled over said platforms; and
    said bowl has a maximum depth less than about the maximum height of said bulge.

10. A turbine stage according to claim 5 wherein said platforms adjoin each other at axial splitlines between adjacent airfoils, and said splitlines bifurcate said bowls axially between said leading and trailing edges in complementary portions.

11. A turbine stage comprising:
    a row of airfoils integrally joined to corresponding platforms and spaced laterally apart to define respective flow passages therebetween for channeling gases;
    each of said airfoils including a concave pressure side and a laterally opposite convex suction side extending in chord between opposite leading and trailing edges; and
    each of said platforms having a scalloped flow surface including a bulge adjoining said pressure side adjacent said leading edge, and a bowl adjoining said suction side aft of said leading edge and centered aft of said bulge.

12. A turbine stage according to claim 11 wherein:
    said bulge decreases in height around said leading edge to join said bowl along said suction side; and
    said bowl extends along said suction side to said trailing edge.

13. A turbine stage according to claim 12 wherein:
    said bulge is centered at said pressure side adjacent said leading edge, and decreases in height forward, aft, and laterally therefrom; and
    said bowl is centered at said suction side near the maximum thickness of said airfoils, and decreases in depth forward, aft, and laterally therefrom.

14. A turbine stage according to claim 13 wherein said bowl has a maximum depth less than about the maximum height of said bulge.

15. A turbine stage according to claim 13 wherein said bulge has a maximum height generally equal to the thickness of the boundary layer of said gases channeled over said platforms.

16. A turbine stage according to claim 13 wherein said bulge is convex forward and aft, and said bowl is concave laterally.

17. A turbine stage according to claim 13 wherein bulge is conical in section between convex forward and aft portions thereof.

18. A turbine stage according to claim 13 wherein:
    said bulge decreases in height rapidly around said leading edge and gradually to said trailing edge; and
    said bowl blends with said bulge rapidly near said leading edge and gradually to said trailing edge.

19. A turbine stage according to claim 13 wherein said bulge decreases in height along said pressure side to said trailing edge, and said bowl decreases in depth along said suction side to said trailing edge.

20. A turbine stage according to claim 13 wherein said bulge and bowl terminate laterally in said flow passage between said trailing edges.

21. A turbine stage according to claim 13 wherein said bulge and bowl commence forward of said leading edges and form laterally therebetween an arcuate channel extending axially along said platform between adjacent airfoils.

22. A turbine stage according to claim 13 wherein said platforms adjoin each other at axial splitlines between adjacent airfoils, and said splitlines bifurcate said bowls axially between said leading and trailing edges in complementary portions.

23. A turbine stage according to claim 13 wherein said bulge bridges said leading edge.

24. A turbine stage according to claim 13 wherein said bulge is centered on the natural stagnation point of said gases at said leading edge.

25. A turbine blade comprising:

an airfoil integrally joined to a platform, and having laterally opposite pressure and suction sides extending in chord between axially opposite leading and trailing edges; and said platform including a bulge adjoining said pressure side adjacent said leading edge, a first bowl portion adjoining said suction side aft of said leading edge, and a second bowl portion integrally formed with said bulge on said pressure side and being complementary with said first bowl portion to define therewith on an adjacent blade a collective bowl.

26. A blade according to claim 25 wherein:

said bulge decreases in height around said leading edge to join said first bowl portion along said suction side; and said first bowl portion extends along said suction side to said trailing edge.

27. A blade according to claim 26 wherein:

said bulge is centered at said pressure side adjacent said leading edge, and decreases in height forward, aft, and laterally therefrom; and said first bowl portion is centered at said suction side near the maximum thickness of said airfoil, and decreases in depth forward and aft therefrom.

28. A blade according to claim 27 wherein:

said bulge decreases in height rapidly around said leading edge and gradually to said trailing edge; and said first bowl portion blends with said bulge rapidly near said leading edge and gradually to said trailing edge.

* * * * *